D. M. SMITH.
Lathe-Work Holder.
No. 10,939.
Patented May 16, 1854.
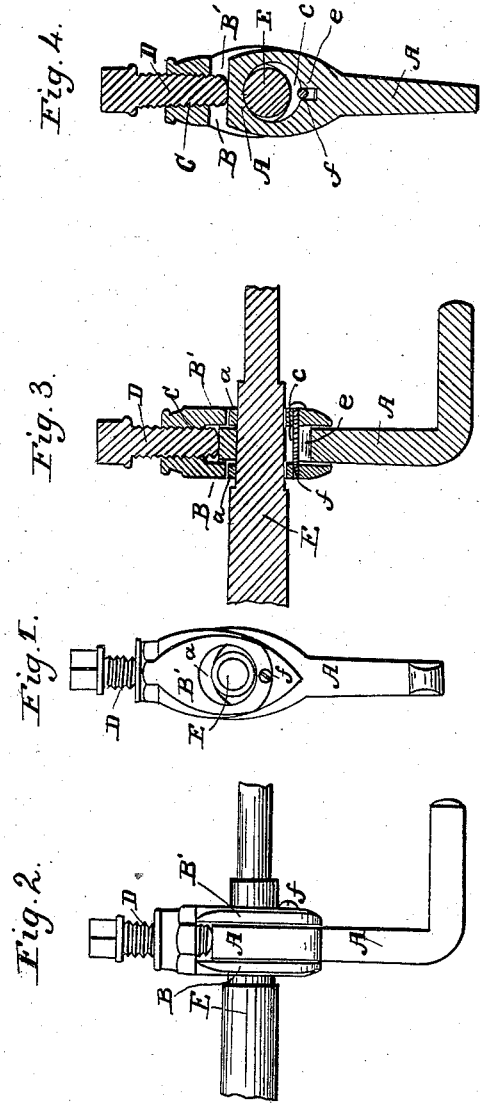

UNITED STATES PATENT OFFICE.

DAVID M. SMITH, OF SPRINGFIELD, VERMONT.

LATHE-DOG.

Specification of Letters Patent No. 10,939, dated May 16, 1854.

*To all whom it may concern:*

Be it known that I, DAVID M. SMITH, of Springfield, in the county of Windsor and State of Vermont, have invented an Improved Lathe-Dog; and I do hereby declare that the same is fully described and represented in the following specification and the accompanying drawings, letters, figures, and references thereof.

Of the said drawings, Figure 1, represents a front elevation of my improved lathe dog. Fig. 2 is a side elevation of it. Fig. 3 a vertical and longitudinal section of it, and Fig. 4 a vertical and transverse section of it.

The common dog used on a turning lathe and for the purpose of enabling the arbor of the lathe to put in rotation a piece of metal or any other material interposed between the two male centers of the lathe, is an article composed of a bent shank or piece of metal (generally bent at a right angle) having an opening or passage through it, and a set screw extending down into said opening in a manner well known to mechanics.

When the dog is used, the article to be held by it is passed through the eye of the dog and the set screw screwed up against the said article so as to force it against the side of the eye. A set screw operating in such manner must always more or less mar that surface of the article against which it bears and particularly should the rotary motion of the article, when such article is being turned in the lathe, be arrested. Now if instead of applying a set screw to the dog in the manner above described, I apply to such dog represented at A, in the drawings a double stirrup, B, B', connected with a female screw, C, which is connected with a male screw, D, which on being screwed through it is made to abut against it on the upper end of the dog, and to force the dog down against an article, while at the same time the double stirrup is drawn up to the article, such article being represented at E, in Figs. 1, 2, 3, and 4. I have called the said stirrup a double stirrup, but it may more properly be termed a forked stirrup, its two tines B, B', being provided with circular holes or passages, *a*, *a*, through them for the reception of the article to be held by the dog and these two tines are placed apart from one another so that the eye part of the dog may be made to extend up between them. There is a recess, *e*, cut down into the eye or opening, *c*, of the dog for the reception of a cross screw rod or bar, *f*, which extends through the two tines of the fork of the stirrup as seen in the drawings and prevents the dog and the stirrup from being entirely separated when the dog is not in use.

A dog constructed on my improved plan will not mar or injure an article as does a common dog whose screw is made to bear directly against the article, and besides my improved dog is generally speaking more available for a more extensive application than the common dog.

I am aware, that there is nothing new in a screw stirrup as applied to the mandrel or center pin of a common turning lathe and for the purpose of confining the said center pin to the puppet head of the lathe, I therefore do not claim such in this relation, but what I do claim is combining the stirrup to the eye of the lathe dog, so that the eye part of the dog shall be made to extend through into the stirrup, and the male screw of the dog be made to screw through the stirrup and against the end of the dog as stated.

I also claim to combine a cross bar or rod with the tines of the stirrup, so that the said cross bar shall pass through the eye of the stirrup and serve to keep the parts together or from entirely separating when not in use as specified.

In testimony whereof I have hereunto set my signature this twenty fifth day of January A. D. 1854.

DAVID M. SMITH.

Witnesses:
R. H. EDDY,
G. P. HALE, Jr.